United States Patent [19]

Kabayama et al.

[11] 4,103,100
[45] Jul. 25, 1978

[54] CELL ADAPTED FOR PRODUCING HIGH TEMPERATURES AND HIGH PRESSURES

[75] Inventors: Takahiko Kabayama, Kamakura; Masaru Ogata, Hatano; Tetsuro Ikezawa, Isehara, all of Japan

[73] Assignee: Kabushiki Kaisha Komatsu Seisakusho, Tokyo, Japan

[21] Appl. No.: 732,855

[22] Filed: Oct. 14, 1976

[51] Int. Cl.² .............................................. F27D 11/02
[52] U.S. Cl. ............................................ 13/20; 13/31
[58] Field of Search ......................... 13/20, 22, 25, 31; 219/407, 406, 390; 432/205

[56] References Cited

U.S. PATENT DOCUMENTS

| | | | |
|---|---|---|---|
| 3,752,456 | 8/1973 | Larker | 13/31 X |
| 3,940,245 | 2/1976 | Smith, Jr., et al. | 13/31 X |
| 3,984,614 | 10/1976 | Isaksson | 13/22 X |

Primary Examiner—R. N. Envall, Jr.
Attorney, Agent, or Firm—Armstrong, Nikaido, Marmelstein & Kubovcik

[57] ABSTRACT

A cell adapted for producing high temperatures and high pressures comprising a three-layered box.

The inner layer is made of an electrically insulating material, the intermediate layer is made of a conductive material and the outer layer is made of an electrically and thermally insulating material. An electric current is permitted to flow through the conductive intermediate layer via electric contacts disposed in the outer layer to heat samples in the sealed chamber.

Gaskets, mounted outside the cell for sealing high pressure in the cell, are prevented from being heated whereby a high pressure sealing effect is maintained effectively even though the cell is heated at a high temperature.

6 Claims, 2 Drawing Figures

CELL ADAPTED FOR PRODUCING HIGH TEMPERATURES AND HIGH PRESSURES

BACKGROUND OF THE INVENTION

This invention relates to a cell for producing high temperatures and high pressures used for synthetizing cubic crystal boron nitride and diamond or the like.

In the synthesis of cubic crystal boron nitride or diamond, an external heating system as shown in FIG. 1 has been most generally used as a device for indirectly heating the mixture of a raw material and a catalyst. In FIG. 1, reference character "a" denotes a sample chamber in which a mixture of a raw material and a catalyst are placed, and "b" an electrically conductive heater element which has been made of a carbon material in general. Reference character "c" denotes a cylindrical member made of an electrically insulating material such as for example alumina or the like. Reference character "d" represents upper and lower discs of an electrically insulating material, "e" a cylindrical member having electrically and thermally insulating properties made, for example of pyrophillite, and "f" electric contact means.

The mixture within the sample chamber "a" is heated by permitting an electric current to flow through the heater element "b".

In this case, the mixture in the sample chamber "a" is heated indirectly. However, the temperature gradient within the sample chamber "a" is large, and the heater element "b" is directly contacted with the electric contact means "f" with high heat loss therefrom. Further, the electric contact means "f" is heated in vicinity of the outer periphery thereof, and so a gasket in contact with the electric contact means "f" is heated. As a result, the pressure sealing effect of the gasket is reduced, and there has been a tendency that sample spouts under a high temperature and a high pressure. Such a tendency was conspicuous particularly in large device.

SUMMARY OF THE INVENTION

It is, therefore, an object of the present invention to provide a cell adapted for producing high temperatures and high pressures wherein the chamber of the cell is heated uniformly so as to reduce the temperature gradient within the chamber.

Another object of the present invention is to provide a cell adapted for producing high temperatures and high pressures wherein gaskets mounted outside the cell for sealing the high pressure in the cell are prevented from being heated so as to effectively maintain a high pressure sealing effect even if the chamber of the cell is heated at a high temperature.

In accordance with the present invention, a cell adapted for producing high temperatures and high pressures comprises an electrically insulating inner cylinder; a pair of electrically insulating discs disposed at the upper and lower ends of said inner cylinder, respectively, thereby sealing samples therein; a conductive intermediate cylinder disposed on said inner cylinder, said intermediate cylinder being adapted to be heated; a pair of conductive discs disposed on said pair of electrically insulating discs at both ends of said intermediate cylinder, the diameter of said conductive discs being equal to the outside diameter of said intermediate cylinder; an electrically and thermally insulating outer cylinder disposed on said intermediate cylinder; a pair of electrically and thermally insulating discs, each having an electric contact, disposed on said pair of conductive discs, respectively, the diameter of said electrically and thermally insulating discs being equal to the inside diameter of said outer cylinder; and means for supplying electric current flow through the electric contacts of said pair of electrically and thermally insulating discs.

Other objects, features and advantages of the present invention will be readily apparent from the following description taken in conjunction with the accompanying drawings.

DETAILED DESCRIPTION OF THE PREFERRED EMBODIMENT

Figure 2:
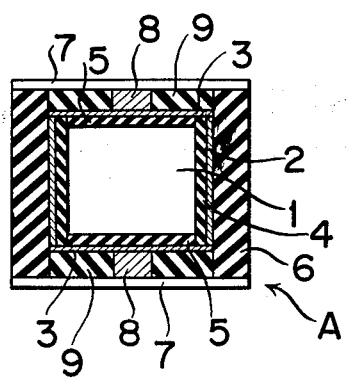
FIG. 2 is similar to FIG. 1 but showing an embodiment of the present invention.

The present invention will now be described below with reference to FIG. 2. In the drawing, reference numeral 1 denotes a sample chamber which comprises a cylindrical member 4 of an electrically insulating material such as for example alumina, etc., and discs 5, 5 of an electrically insulating material such as for example alumina or agalmatolite or the like which are adapted to be fitted to the upper and lower ends of the cylindrical member 4. A cylindrical heater element 2 of an electrically conductive material is mounted on the outer periphery of the cylindrical member 4, whilst disposed outside the discs 5, 5 are disc-shaped electrically conductive members 3, 3 of a metallic material having a high heat-resistivity such as for example molybdenum etc. Disposed on the outer periphery of the cylindrical heater element 2 is a cylindrical member 6 of a material having electrically and thermally insulating properties such as for example pyrophyllite. Fitted into the upper and lower ends of the cylindrical electrically and thermally insulating member 6 are electrically and thermally insulating members 9, 9 made for example of pyrophyllite etc. The cylindrical member 6 and the electrically and insulating members 9, 9 form an insulator "A". Therefore, the electrically and thermally insulating members 9, 9 are disposed outside the aforementioned electrically conductive materials or members 3, 3. The electrically and thermally insulating members 9, 9 have electric contacts 8, 8 secured thereto, respectively. Disposed outside the electrically and thermally insulating members 9, 9 are electric contact means 7, 7 which are electrically connected through the electric contacts 8, 8 with the electrically conductive materials 3, 3. And electric contacts 8, 8 made of carbonaceous material act as heaters, too.

In operation, a mixture of a raw material and a catalyst is put into the sample chamber 1, and an electric current is applied by the electric contact means 7, 7 to and flows through the electric contacts 8, 8, the electrically conductive materials 3, 3 and the heater element or means 2 so that the mixture may be heated.

Since the heater element 2 is surrounded by an insulator "A" comprising the electrically and thermally insulating members 9, 9 and the cylindrical member 6, and also the heater element 2 is not directly contacted with the electric contact means 7, 7, there is less tendency that the electric contact means 7, 7 are exposed to high temperatures. Further, the provision of the metal plates 3, 3 made of a material having a high heat-resistivity such as molbydenum inside the electrically and thermally insulating members 9, 9 prevents the materials charged into the sample chambers from leaking to the outside and also increases the pressure generating efficiency within the sample chamber. Such a tendency becomes conspicuous as the size of the sample chamber becomes bigger.

Experiments for synthetizing cubic crystal boron nitride were made, using the high temperature and high pressure generating device according to the present invention.

The sample chamber used for the experiment was 12 mm in inside diameter and 13 mm in height. A mixture of 3.2 grams of hexagonal crystal boron nitride and a catalyst (Si-Al-alloy) is put into the sample chamber which was then heated and pressurized to obtain a pressure of 58,000 atomospheres and a temperature of 1,800° C for conducting a synthesis test of cubic crystal boron nitride. Throughout 30 tests no spouting of the sample could be observed in the pressurizing and heating process so that cubic crystal boron nitride of excellent quality could be obtained at a high yield of more than 60%.

Figure 1:
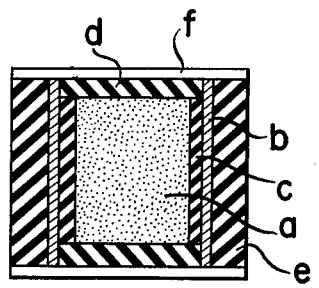
FIG. 1 is a cross sectional view of a conventional cell adapted for producing high temperatures and high pressures.

Furthermore, 10 boron nitride synthesis tests were conducted within the sample chamber of the same volume under the same pressure and temperature conditions, using the conventional high temperature and high pressure generating device as shown in FIG. 1. However, in the process of pressurizing and heating, the sample spouted seven times, and therefore continuation of the experiment became impossible. Further, the yield of cubic crystal boron nitride in the synthetized sample after the completion of three experiments was 30 to 50%; however, crystals of cubic crystal boron nitride of excellent quality could not be obtained.

Since various changes and modifications of the present invention will occur to and can be made readily by those skilled in the art without departing from the concept of the invention, the invention is not to be taken as limited except by the scope of the appended claims.

We claim:

1. A cell adapted for producing high temperatures and high pressures comprising, an electrically insulating inner cylinder;
    a pair of electrically insulating discs disposed at the upper and lower ends of said inner cylinder, respectively, thereby forming a sealed chamber for containing samples therein;
    a heater means including a conductive intermediate cylinder disposed on said inner cylinder, and a pair of conductive discs disposed on said pair of electrically insulating discs at both ends of said intermediate cylinder, the diameter of said conductive discs being equal to the outside diameter of said intermediate cylinder;
    an electrically and thermally insulating outer cylinder disposed on said intermediate cylinder;
    a pair of electrically and thermally insulating discs, each having an electric contact, disposed on said pair of conductive discs, respectively, the diameter of said electrically and thermally insulating discs being equal to the inside diameter of said outer cylinder; and
    means for supplying electric current flow through the electric contacts of said pair of electrically and thermally insulating discs.

2. The cell as defined in claim 1 wherein said inner cylinder and said pair of electrically insulating discs are formed of alumina.

3. The cell as defined in claim 1 wherein said pair of electrically conductive discs are made of molbydenum.

4. The cell as defined in claim 1 wherein said electrically and thermally insulating cylinder and pair of discs are made of pyrohyllite.

5. The cell as defined in claim 1 wherein said means include a pair of electric contact means.

6. The cell as defined in claim 1 wherein the electric contacts of said pair of electrically and thermally insulating discs are made of carbonaceous material.

* * * * *